(12) United States Patent
Zhao et al.

(10) Patent No.: US 11,355,275 B2
(45) Date of Patent: Jun. 7, 2022

(54) LASER-SCRIBED GRAIN-ORIENTED SILICON STEEL RESISTANT TO STRESS-RELIEF ANNEALING AND MANUFACTURING METHOD THEREFOR

(71) Applicant: BAOSHAN IRON & STEEL CO., LTD., Shanghai (CN)

(72) Inventors: Zipeng Zhao, Shanghai (CN); Guobao Li, Shanghai (CN); Yongjie Yang, Shanghai (CN); Meihong Wu, Shanghai (CN); Changsong Ma, Shanghai (CN); Yaming Ji, Shanghai (CN); Chen Ling, Shanghai (CN); Weiyong Xie, Shanghai (CN); Jianguo Guo, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 315 days.

(21) Appl. No.: 16/492,800

(22) PCT Filed: Jan. 24, 2018

(86) PCT No.: PCT/CN2018/074023
§ 371 (c)(1),
(2) Date: Sep. 10, 2019

(87) PCT Pub. No.: WO2018/177007
PCT Pub. Date: Oct. 4, 2018

(65) Prior Publication Data
US 2020/0058434 A1  Feb. 20, 2020

(30) Foreign Application Priority Data

Mar. 27, 2017  (CN) .......................... 201710187566.3

(51) Int. Cl.
*H01F 27/245*  (2006.01)
*B23K 26/364*  (2014.01)
(Continued)

(52) U.S. Cl.
CPC ......... *H01F 27/245* (2013.01); *B23K 26/364* (2015.10); *C21D 8/1222* (2013.01);
(Continued)

(58) Field of Classification Search
CPC ...... B23K 26/364; C21D 8/12; C21D 8/1222; C21D 8/1233; C21D 8/1266; C21D 8/1283; C21D 8/1294; C25F 3/06; H01F 27/245
See application file for complete search history.

(56) References Cited

U.S. PATENT DOCUMENTS 6,103,022 A    8/2000  Komatsubara et al.
6,110,298 A *  8/2000  Senda ...................... C21D 8/12
                                                      148/111
(Continued)

FOREIGN PATENT DOCUMENTS

CN    102031342    1/2013
CN    105463172    4/2016
(Continued)

OTHER PUBLICATIONS

International Search Report and Written Opinion dated May 2, 2018 for PCT Patent Application PCT/CN2018/074023.
(Continued)

*Primary Examiner* — Jenny R Wu
(74) *Attorney, Agent, or Firm* — Lei Fang; Smith Tempel Blaha LLC

(57) ABSTRACT

A laser-scribed grain-oriented silicon steel resistant to stress-relief annealing and a manufacturing method therefor. Parallel linear grooves (20) are formed on one or both sides of grain-oriented silicon steel (10) by laser etching. The linear grooves (20) are perpendicular to, or at an angle to, the rolling direction of the steel plate. A maximum height of edge protrusions of the linear grooves (20) does not exceed
(Continued)

5 μm, and a maximum height of spatters in etch-free regions between adjacent linear grooves (20) does not exceed 5 μm, and the proportion of an area occupied by spatters in the vicinity of the linear grooves (20) does not exceed 5%. The steel has low manufacturing costs, and the etching effect of the finished steel is retained during a stress-relief annealing process. The steel is suitable for manufacturing of wound iron core transformers.

15 Claims, 4 Drawing Sheets

(51) Int. Cl.
    *C21D 8/12* (2006.01)
    *C25F 3/06* (2006.01)
(52) U.S. Cl.
    CPC ......... *C21D 8/1233* (2013.01); *C21D 8/1266* (2013.01); *C21D 8/1283* (2013.01); *C21D 8/1294* (2013.01); *C25F 3/06* (2013.01)

(56) References Cited

U.S. PATENT DOCUMENTS

| | | | |
|---|---|---|---|
| 2018/0066334 A1 | 3/2018 | Mogi et al. | |
| 2018/0371573 A1* | 12/2018 | Kwon | C21D 8/1283 |

FOREIGN PATENT DOCUMENTS

| | | | |
|---|---|---|---|
| CN | 106282512 | | 1/2017 |
| CN | 107406935 A | | 11/2017 |
| EP | 0869190 A1 | | 10/1998 |
| EP | 2554685 A1 | | 2/2013 |
| EP | 3287538 A1 | | 2/2018 |
| EP | 3395963 A1 | | 10/2018 |
| IN | 201827027055 | | 9/2020 |
| JP | H10324959 A | | 12/1998 |
| JP | 2003129135 | | 5/2003 |
| JP | 2007169762 A | * | 7/2007 |
| KR | 20130128731 A | | 11/2013 |
| KR | 20150073549 A | | 7/2015 |
| KR | 101626601 B1 | | 6/2016 |
| KR | 20160078104 A | | 7/2016 |
| WO | 2016171124 A1 | | 10/2016 |
| WO | 2016171130 A1 | | 10/2016 |

OTHER PUBLICATIONS

Office Action dated Mar. 16, 2021 for Korean Patent Application No. 20197029635.
Office Action dated Nov. 6, 2019 for European Patent Application No. 18774249.
Supplementary European Search Report dated Sep. 3, 2020 for European Patent Application No. 18774249.
European Search Report dated Sep. 14, 2020 for European Patent Application No. 18774249.
Office Action dated Nov. 4, 2020 for Japanese Patent Application No. 2019548294.
Office Action dated Dec. 23, 2020 for Canadian Patent Application No. 3055234.
1st Office Action dated May 5, 2019 for Chinese Patent Application No. 201710187566.
Examination Report dated Jan. 31, 2021 for Indian Patent Application No. 201947042579.

* cited by examiner

LASER-SCRIBED GRAIN-ORIENTED SILICON STEEL RESISTANT TO STRESS-RELIEF ANNEALING AND MANUFACTURING METHOD THEREFOR

CROSS-REFERENCE TO RELATED APPLICATIONS

This application is a 371 U.S. National Phase of PCT International Application No. PCT/CN2018/074023 filed on Jan. 24, 2018, which claims benefit and priority to Chinese patent application no. 201710187566.3, filed on Mar. 27, 2017. Both of the above-referenced applications are incorporated by reference herein in their entireties.

TECHNICAL FIELD

The present invention relates to grain-oriented silicon steel and a manufacturing method therefor, and particularly to laser-scribed grain-oriented silicon steel resistant to stress-relief annealing and a manufacturing method therefor

BACKGROUND ART

In recent years, global energy and environmental issues have become increasingly prominent, and the demand for energy conservation and consumption reduction is increasing worldwide. As a result, energy consumption standards of equipment have been generally raised in countries in order to reduce the reactive power consumption of various types of equipment. At present, transformers, as a basic component of power transmission systems, account for about 40% of the loss of the power transmission system. The iron core produced by laminating or winding grain-oriented silicon steel has a reactive power consumption that accounts for about 20% of the total loss under working conditions. Iron core loss is often referred to as iron loss. It can be seen that reducing the iron loss of grain-oriented silicon steel is of great significance to the national economy and environmental protection.

Grain-oriented silicon steel is a ferromagnetic material, which is named after its internal grain {110}<001> orientation is substantially consistent with the direction of rolling the silicon steel into a steel plate. Grain-oriented silicon steel is widely used in the manufacture of transformers for power transmission because of its best magnetic permeability in the {110}<001> direction. The magnetic permeability of the grain-oriented silicon steel is generally characterized by B8, i.e., the magnetic flux density of the silicon steel plate at an excitation magnetic field of 800 A/m, in units of T. The iron loss is generally characterized by P17/50, i.e., the ineffective electric energy consumed by magnetization when the magnetic flux density in the silicon steel plate reaches 1.7 T at an AC excitation field of 50 Hz, in units of W/kg. In general, B8 and P17/50 characterize the fundamental properties of grain-oriented silicon steel under the operating conditions of transformers.

The general manufacturing process for grain-oriented silicon steel is as follows.

The steel material having certain silicon content is subjected to iron making, steel making, continuous casting, and then subjected to hot rolling process. Next, single cold rolling or double cold rollings with intermediate annealing is performed to roll the steel material to a desired thickness. Then, decarburization annealing is performed to obtain a primary recrystallized steel plate having an oxide film on its surface. Then, the steel plate is coated with a MgO-based separator on the surface, and subjected to high-temperature annealing for 20 hours or more, forming an grain-oriented silicon steel plate having a secondary recrystallization structure. Then, hot stretching, temper rolling and annealing are performed, a coating is applied and a baking process is performed, producing a finished grain-oriented silicon steel. The grain-oriented silicon steel has the characteristics of high magnetic induction and low iron loss, and is particularly suitable for the manufacture of a transformer iron core.

The iron loss of grain-oriented silicon steel consists of three parts: hysteresis loss, eddy current loss and abnormal eddy current loss. Hysteresis loss is the energy loss caused by the magnetic hysteresis in which the variation in magnetic induction intensity falls behind the variation in the magnetic field intensity. Magnetic hysteresis is caused by the obstruction of magnetic domain wall motion in the magnetization and demagnetization process due to factors such as inclusions, crystal defects and internal stress in a material. Eddy current loss is the energy loss caused by the eddy current and is related to the electrical conductivity and thickness of the silicon steel plate, wherein the eddy current is caused by the local electromotive force induced by the change in the magnetic flux during the magnetization process. Abnormal eddy current loss is the energy loss caused by the difference in magnetic domain structure when the silicon steel plate is magnetized, and is mainly affected by the width of the magnetic domain.

The magnetic domain structure inside the grains of grain-oriented silicon steel is formed by the interaction of spontaneous magnetization and demagnetizing field. The magnetic moments of the atoms inside a single magnetic domain are arranged in the same direction, so that the macroscopic crystals exhibit ferromagnetism. In the absence of an external magnetic field, the magnetic domains of the grain-oriented silicon steel are mainly antiparallel 180° magnetic domains. The width of a single magnetic domain can typically be on the order of tens of microns or even millimeters. A transition layer of several tens to hundreds of atomic layers exists between adjacent magnetic domains, which is named as a magnetic domain wall. During the magnetization process, the magnetic moment is rotated by the external field, and the migration of magnetic domain wall causes the adjacent magnetic domains to be mutually annexed, thereby realizing the magnetic conductive function. Refining the magnetic domain (i.e., reducing the width of the magnetic domain) can effectively reduce the abnormal eddy current loss, and is an important method to reduce the iron loss of the silicon steel plate, and is also one of the main development directions of the grain-oriented silicon steel technology.

Techniques for etching the surface of grain-oriented silicon steel to refine the magnetic domains for reducing iron loss can be divided into two categories according to the effect of the etching. One type is an etching technique that is not resistant to stress-relief annealing. In this technique, a linear thermal stress region is formed on the surface at a certain interval by a laser, a plasma beam, an electron beam, or the like to cause sub-magnetic domains around the region, thereby reducing the width of the 180° magnetic domain and achieving the purpose of reducing iron loss. In such a method, the refinement effect of the magnetic domains disappears with the elimination of thermal stress at the nick after the stress-relief annealing, and the iron loss then returns to the original level. Therefore, such method can only be used in the manufacture of laminated iron core transformers without stress-relief annealing. Another type is an etching technique that is resistant to stress-relief annealing. The technical means currently reported are mechanical, electrochemical corrosion, laser beam and the like. The technical solution generally comprises: forming a linear strain zone on the surface of the grain-oriented silicon steel to redistribute the internal energy, thereby reducing the width of the 180° magnetic domain and reducing the iron loss. The iron loss of the grain-oriented silicon steel produced by such a method does not recover after stress-relief annealing. Therefore, such a method can be applied to the manufacture of a wound iron core transformer that requires stress-relief annealing. The wound iron core transformer makes full use of the superiority of the magnetic properties of the grain-oriented silicon steel in the rolling direction, and has obvious advantages in terms of loss and noise, so it is favored by downstream users. Grain-oriented silicon steel resistant to stress-relief annealing is particularly suitable for the manufacture of such type of transformers and is a direction of technological development.

In U.S. Pat. No. 4,770,720, a microstrain zone is formed on the surface of silicon steel using mechanical pressure means. Small grains are formed below the strain zone after stress-relief annealing. A refinement effect of the magnetic domains is produced since the orientation of the small crystal grains is different from the orientation of the substrate.

In U.S. Pat. No. 7,063,780, a heat resistant etching effect is achieved by a electrolytic corrosion method. First, the grain-oriented silicon steel plate having an underlayer is linearly processed by a laser to peel off the underlayer, and the metal substrate is exposed in the region. The grain-oriented silicon steel plate is then immersed in the electrolyte to form an electrode pair between the silicon steel plate and the platinum electrode. The substrate is electrolytically scribed by alternately controlling the positive and negative changes in the electrode potential so that the region forms linear grooves close to a rectangle.

In U.S. Pat. No. 7,045,025, the surface of a silicon steel plate before or after hot stretching, temper rolling and annealing is subjected to local linear heating using a laser beam to form a remelting zone. The coating material and a part of the metal substrate are melted, cooled, and solidified to form a remelting zone, and the iron loss of the silicon steel plate is reduced by controlling the width and depth of the remelting zone.

In Chinese patent CN102941413A, a multiple laser engraving method is used for a precise control of the depth and width of the grooves and to reduce the iron loss of the silicon steel sheet by 8% or more. In U.S. Patent No. US20130139932, grooves having a certain depth are formed on the surface of the silicon steel by controlling the energy density of the laser beam. The equiaxial crystal regions formed at the grooves reduce the size of the secondary recrystallized grains, and thus the magnetic domains are refined.

In the heat-resistant etching technique of grain-oriented silicon steel, a series of grooves or strains are formed on the surface of the steel plate by a certain means to refine the magnetic domains and reduce the iron loss. Since the presence of the grooves or strains does not change due to annealing, the reduction effect of the iron loss does not disappear during the stress-relief annealing process, and therefore the technique is particularly suitable for the manufacture of a wound iron core transformer.

Efficient and low-cost production of the grain-oriented silicon steel resistant to stress-relief annealing is a common problem for steel manufacturers. The key point thereof is that it is difficult to obtain both the microscopic characteristics of the etching grooves and macro mass production.

The conventional heat-resistant etching technique by electrochemical means has a complicated process and a certain degree of chemical contamination. Moreover, the shape and depth of the grooves are less controllable, and it is difficult to obtain a grain-oriented silicon steel sheet having stable and uniform magnetic properties. The technical solution of forming grooves by mechanical pressure is extremely demanding on the toothed rolls. Moreover, the high hardness of the magnesium silicate underlayer on the surface of the grain-oriented silicon steel causes the toothed rolls to wear quickly, resulting in high cost in mass production. The method of forming grooves by multiple laser-scanning requires high repeat positioning precision, resulting in difficulty in flow line production. The method of forming grooves or remelting zones by laser thermal melting tends to produce crater-like protrusions and spatters at and near the edge of the grooves, resulting in a decrease in the lamination factor of the silicon steel sheets. And the transformer made by the method has the risk of breakover between sheets during the service.

Grain-oriented silicon steel is named for its inner crystal grains having substantially the same direction. The grain-oriented silicon steel is an electrical steel plate having a certain silicon content and an easy magnetization direction being substantially the same as the rolling direction of the manufacturing process. Inside the steel plate, there are 180° domains which are the same as or opposite to the easy magnetization direction of the grains. During AC magnetization, the magnetic poles in the steel plate realize rapid rotation by the movement of the magnetic domain wall between adjacent magnetic domains. Therefore, the steel plate has good magnetic permeability, and the transformer made of the steel plate has high magnetic permeability and low iron loss.

It is desirable in silicon steel technology to continuously reduce the iron loss of silicon steel materials. There are currently two technical routes to reduce the iron loss of silicon steel sheets. In one technical solution, by a metallurgical method, the iron loss is reduced by controlling the secondary recrystallization structure and increasing the degree of orientation, and the easy magnetization direction of crystal grains is as consistent as possible with the direction of rolling the silicon steel into a steel plate, that is, reducing the deviation angle of the grain orientation. The other is to reduce the iron loss by reducing the width of the magnetic domains, that is, to refine the magnetic domains. The refinement of the magnetic domains can reduce the abnormal eddy current loss of the grain-oriented silicon steel. A micro-linear thermal stress region substantially perpendicular to the rolling direction is applied to the surface of the finished grain-oriented silicon steel by laser or electron beam or the like, as described in U.S. Pat. Nos. 7,442,260 B2, 5,241,151, and the like. The stree results in a 90° magnetic domain perpendicular to the rolling direction in its vicinity, so that the width of the 180° magnetic domain is reduced, thereby reducing the iron loss of the grain-oriented silicon steel. These products have been widely used in the manufacture of various laminated iron core transformers.

With the increasing demand for energy saving and environmental protection, wound iron core transformers are gradually gaining favor from the market. The silicon steel plate of wound iron cores is made by winding in the direction of rolling the silicon steel into a steel plate, and the magnetic properties of the grain-oriented silicon steel in the rolling direction are fully utilized. Therefore, compared with the laminated iron core, the wound iron core has the advantages of low loss, low noise, no shear waste, and the like, and is particularly suitable for the manufacture of small and medium energy-saving transformers. However, internal stress generated in the iron core during the winding process causes deterioration of the iron loss performance of the silicon steel plate. Therefore, the iron core must be subjected to stress-relief annealing. The process of stress-relief annealing is generally as follows: in a protective atmosphere, the temperature is maintained at 800° C. or more for 2 hours or more to completely recover the internal dislocations of the material, and the internal stress is completely eliminated, and the magnetic properties of the silicon steel sheet are optimal. For the grain-oriented silicon steel plate in which the magnetic domains are refined by using a conventional laser or electron beam to generate linear stress regions, the refinement effect of the magnetic domains disappears with the elimination of the stress after the stress-relief annealing. Therefore, such grain-oriented silicon steel plate cannot be used for the manufacture of a wound iron core transformer.

In order to maintain the refinement effect of magnetic domains after stress-relief annealing, a magnetic domain refining technique resistant to stress-relief annealing has been developed. In the technique, grooves having a certain shape are formed on the surface of the silicon steel plate by chemical etching or mechanical pressure. The free magnetic poles generated at the grooves re-distribute the material energy, reducing the width of magnetic domains and reducing the iron loss. Since the grooves do not change during the stress-relief annealing process, the grain-oriented silicon steel plate produced by this type of technology can be applied to the manufacture of wound iron core transformers. This type of technology is collectively referred to as heat-resistant etching technology.

The heat-resistant etching techniques currently available for commercial applications are chemical etching method and mechanical scoring method. Since the production process of the chemical etching method involves chemical reactions, the method has proor groove uniformity and process controllability, and has certain pollution to the environment. For the technical solution of forming the strain zone by mechanical pressure, since the silicon steel material has high hardness and the grooves have a small size, the technical solution has high requirements on the hardness of the mechanical device and machining precision. In U.S. Pat. No. 7,045,025, hot-melt zones are formed by laser processing. Due to the high melting point and high thermal conductivity of the metal, crater-like protrusions are formed at the edges of the grooves due to the melting of the metal, and adhesive deposits formed by cooling and recondensing after the metal gasification will be produced in the vicinity, reducing the lamination factor of the silicon steel sheet and increasing the risk of breakover between the sheets during the service of the transformer. In Chinese patent CN102941413A, the problem of a decrease in lamination factor due to spatters is overcome by multiple laser-scoring. However, the efficiency of repeated scoring is low, and repeated positioning is difficult, resulting in difficulty in mass production using industrial assembly lines.

SUMMARY OF THE INVENTION

The object of the present invention is to provide a laser-scribed grain-oriented silicon steel plate resistant to stress-relief annealing and a manufacturing method therefor. The steel plate has low manufacturing costs, and the etching effect of the finished steel plate is retained during a stress-relief annealing process. The steel plate is particularly suitable for the manufacture of wound iron core transformers.

In order to achieve the above object, the technical solution of the present invention is as follows.

A laser-scribed grain-oriented silicon steel resistant to stress-relief annealing, wherein parallel linear grooves are formed on one or both sides of grain-oriented silicon steel by laser etching, the linear grooves are perpendicular to, or at an angle to, the direction of rolling the silicon steel into a steel plate; a maximum height of edge protrusions of the linear grooves does not exceed 5 μm, and a maximum height of spatters in etch-free regions between adjacent linear grooves does not exceed 5 μm, and the proportion of an area occupied by spatters in the vicinity of the linear grooves does not exceed 5%.

Preferably, the height of spatters in etch-free regions between linear grooves does not exceed 2 μm, and the proportion of an area occupied by spatters in the vicinity of the linear grooves does not exceed 2.5%.

Preferably, the line roughness $R_a$ of the center line in the bottom of the linear grooves is not more than 2.1 μm.

Preferably, the line roughness $R_a$ of the center line in the bottom of the linear grooves is not more than 0.52 μm.

Preferably, the linear groove is approximately triangular, trapezoidal, semi-circular or elliptical.

Preferably, the angle between the linear groove and the direction of rolling the silicon steel into a steel plate is 0~30°.

Preferably, the linear groove has a width of 5 to 300 μm and a depth of 5 to 60 μm, and the space between adjacent linear grooves is 1 to 10 mm.

The method for manufacturing the laser-scribed grain-oriented silicon steel resistant to stress-relief annealing according to the present invention, comprises steps of smelting, continuous casting, hot rolling, single cold rolling or double cold rolling with intermediate annealing, decarburization annealing, high-temperature annealing, forming a finished grain-oriented silicon steel by hot stretching, temper rolling and annealing and applying an insulating coating, wherein the method further comprises a step of laser-etching, which is performed before the decarburization annealing, or before or after the hot stretching, temper rolling and annealing; the laser-etching comprises the following steps:

1) forming a protective film on the surface of the grain-oriented silicon steel;

2) laser-etching a surface of the grain-oriented silicon steel to form a series of linear grooves perpendicular to or at an angle to the direction of rolling the silicon steel into a steel plate;

3) Brushing the surface of the grain-oriented silicon steel to remove the protective film and drying.

Preferably, the protective film is formed by a metal oxide powder, and has a moisture content of between 0.3 wt % and 5.5 wt %.

Preferably, the protective film has a thickness of between 1.0 μm and 13.0 μm.

Preferably, the metal oxide powder is water-insoluble, and is a single powder or a combination of several powders, and the proportion of particles having a particle diameter of 500 μm or more in the powder is 10% by volume or less.

Preferably, the metal oxide powder is one or more of an alkaline earth metal oxide, $Al_2O_3$, ZnO or ZrO.

Preferably, the laser generating pump source used in the laser-etching step is one or more of a $CO_2$ laser, a solid laser, and a fiber-optic laser, and the laser is continuous or pulsed.

Preferably, the power density I of the laser in the laser-etching step is not less than $1.0 \times 10^6$ W/cm$^2$, and the average energy density $e_0$ is between 0.8 J/mm$^2$ and 8.0 J/mm$^2$, and the ratio a of the average energy density to the thickness of the protective film is between 0.6 and 7.0.

Moreover, a method for manufacturing the laser-scribed grain-oriented silicon steel resistant to stress-relief annealing according to the present invention, comprises steps of smelting, continuous casting, hot rolling, single cold rolling or double cold rolling with intermediate annealing, decarburization annealing, applying MgO separator on the surface of the steel plate, high-temperature annealing, forming a finished grain-oriented silicon steel by hot stretching, temper rolling and annealing and applying an insulating coating, wherein laser-etching is performed after the decarburization annealing to form a series of linear grooves on the surface of the grain-oriented silicon steel perpendicular to or at an angle to the direction of rolling the silicon steel into a steel plate.

The present invention studies in detail the thermal diffusion during laser-etching under different surface states of silicon steel sheets, and the method of preventing thermal melting and spatters from adhering and accumulating near the grooves. The inventors creatively proposes a method in which a heat-resistant scribed grain-oriented silicon steel is produced by coating a protective film on a surface of an grain-oriented silicon steel, laser-etching and then brushing. In the method of the present invention, stable and controllable grooves can be formed by one-time laser scanning, the magnetic domains are refined and the iron loss is reduced without causing significant degradation of the lamination factor, and the effect of reducing the iron loss does not disappear after the stress-relief annealing. The inventors observed through a high-speed imaging microscope that the protrusions on the edge of the grooves are caused by the melting and accumulation of a part of the metal due to the heat transfer during laser-etching process. In addition, the spatters near the grooves are formed by rapidly cooling the vaporized metal or plasma under the purge condition and condensing on the surface of the silicon steel sheet. The inventors have obtained a solution of controlling the edge protrusions of the grooves by laser-etching after applying a protective film. FIG. 2 illustrates the effect of the protrusions on the edge of the grooves on the lamination factor, and the scope of the invention. When the height of the edge protrusions exceeds 5 µm, the lamination factor is reduced to 95% or less, which does not satisfy the requirements of the manufacturing process of the transformer iron core. Therefore, it is necessary to control the height of the protrusions on the edge of the grooves to be 5 µm or less.

FIG. 3 illustrates the height of the spatters between adjacent grooves, the ratio of the area occupied by the spatters, and the range of the lamination factor required by the present invention. When the height of the spatters formed between the adjacent grooves does not exceed 5 µm and the proportion of spatters per unit area does not exceed 5.0%, the lamination factor of the grain-oriented silicon steel sheet can be maintained at 95% or more. In particular, when the height of the spatters does not exceed 2 µm and the proportion of the spatters per unit area does not exceed 2.5%, the lamination factor of the silicon steel sheet can be maintained at 96% or more, which is preferable in the present invention.

It should be noted that in order to prevent the breakover between sheets or the increase of vibration noise due to spatters or protrusions during the service of the transformer, both the height of the edge protrusions and the height of the spatters in the present invention refer to the maximum height, rather than the average height.

In addition, the line roughness $R_a$ of the center line in the bottom of the grooves has an important influence on the uniformity of the magnetic properties of the finished silicon steel sheet. The larger the line roughness $R_a$ of the center line in the bottom of the grooves, the greater the fluctuation in magnetic properties between the sheets. The reason for this phenomenon is that the unevenness at the bottom of the grooves causes a difference in the magnetic permeability efficiency at different positions. In the grooves, the shallower portion has higher magnetic permeability, while the deeper portion has lower magnetic permeability due to magnetic flux leakage. Moreover, the uneven magnetic permeability causes disordered energy field distribution inside the material, and a large number of non-180° sub-magnetic domains are generated near the grooves, and thus the iron loss cannot be improved. FIG. 4 shows that the standard deviation of the iron loss P17/50 between the silicon steel sheets increases as $R_a$ increases. When $R_a$ exceeds 2.1 µm, the standard deviation of P17/50 between silicon steel sheets rapidly increases and exceeds 0.034 W/kg, greatly increasing the uncertainty of the performance of the transformer produced. Therefore, it is necessary to control the roughness of the center line in the bottom of the grooves to be 2.1 µm or less. In particular, when $R_a$ is less than 0.52 µm, the fluctuation of P17/50 is less than 0.013 W/kg, and the uniformity is good, which is preferable in the present invention.

The above-mentioned protrusions and spatters on the edge of the grooves and the unevenness at the bottom of the grooves are all inevitable phenomena due to the inevitable heat melting or diffusion when the laser evaporates the ablative material to form grooves. By adjusting the laser energy and the thickness, moisture content and particle size parameters of the protective film, the invention achieved an effective control of the protrusions and spatters on the edge of the grooves until they completely disappeared, obtaining uniform grooves, and significantly reducing the iron loss.

The method of introducing a protective film before laser-etching in the present invention can sufficiently reduce heat diffusion generated during laser-etching. Moreover, for the unavoidable spatters, since they only condense on the surface of the film, they are removed together with the removal of the film during the subsequent brushing process, thereby minimizing the formation of surface spatters. The effect of the etching after applying the protective film is as shown in FIG. 7. The grooves of the grain-oriented silicon steel sheet obtained after subsequent brushing are as shown in FIG. 8. It can be seen that the grooves have high flatness, and there is no slag or spatter formed due to thermal diffusion nearby. The grain-oriented silicon steel can be used for the manufacture of a wound iron core transformer.

In order to effectively reduce the thermal diffusion during the etching process, the protective film material needs to have excellent thermal conductivity properties and a good absorption effect on the laser to sufficiently improve the ablation efficiency in the laser-etching process. The inventors have determined the relevant parameters for fully functioning the protective film by detailed research, including the main components, the moisture content of the protective film, and the size distribution of the particles forming the protective film.

Studies by the inventors have shown that the moisture in the protective film has a direct influence on the protrusions on the edge of the grooves. This is because during the laser-etching process, the vaporization and volatilization of moisture in the protective film will take away heat, provide a directional channel for heat conduction, reduce or even eliminate the diffusion of the heat toward the edge of the base grooves during etching, reduce the hot melt layer at the edges, thereby forming a uniform and controllable groove morography. However, the presence of excess moisture causes high temperature oxidation of the substrate during ablation, resulting in deterioration of magnetic properties and difficulty in controlling the thickness of the film during roll coating or spraying. The inventors have determined through experiments that the moisture having a weight percentage of not less than 0.3% contributes to the outward diffusion of heat through the protective film to form controllable grooves. The moisture having a weight percentage of not more than 5.5% can effectively control the high temperature oxidation caused by laser-etching. It should be noted that the moisture in the protective film of the present invention may exist in the state of free water or crystal water. When the moisture is present in any of the above forms, the weight percentage refers to the percentage of the weight of the moisture. When both free water and crystal water are present in the protective film, the weight percentage refers to the sum of the weight percentages of the two kinds of moistures.

The protective film used in the present invention before the etching is formed by roll coating or spraying water-insoluble metal oxide powders. The proportion of the particles having a diameter of 500 μm or more should not exceed 10%. The reason is that different sizes of particles have different scattering effect for laser light, which directly affects the ablation efficiency of laser-etching. When the proportion of particles having a diameter of 500 μm or more exceeds 10%, the scattering effect of the protective film on the laser light is remarkable and the efficiency of the laser ablation is low, resulting in the formation of protrusions on the edge of the grooves due to heat melting. Therefore, for the particles of the protective film material used in the present invention, it is required that the proportion of the particles having a diameter of 500 μm or more does not exceed 10%.

The protective film used in the present invention before laser-etching is formed as follows: the metal oxide powder is dispersed in water, and then stirred at a high speed to form slurry; the slurry is applied to the surface of the steel belt by roll coating or spraying, and dried at a temperature of 200° C. or higher. The inventors have determined through experiments that the water-insoluble metal oxide has good dispersibility in water after high-speed stirring, and therefore can effectively adhere to the surface of the silicon steel and carry a certain amount of free water or crystal water, which contributes to the outward diffusion of heat during laser-etching, thereby forming scored grooves having a good shape. Particularly, the water-insoluble metal oxide is preferably an alkaline earth metal oxide and $Al_2O_3$, $ZnO$ or $ZrO$.

Further, the power density I of the laser used in the present invention must be higher than $1.0 \times 10^6$ W/cm². The power density I of the laser is defined as follows:

$$I = \frac{P}{S}$$

wherein, P is the output power of the laser, and S is the area of the spot containing 96% or more of the beam energy.

FIG. 5 illustrates the relationship between the power density I of the laser and the improvement rate of iron loss and the lamination factor after etching in the present invention. When the power density I is $1.0 \times 10^6$ W/cm², both the improvement rate of the iron loss and the lamination factor change significantly. The reason is that, when the power density I is less than $1.0 \times 10^6$ W/cm², the surface of the steel plate has a low absorption rate for laser during laser etching and most of the laser energy is reflected, causing the heated area on the surface to fail to reach the vaporization temperature. Thus, the grooves are mainly formed by melting, and melts are formed on the edge of the grooves, and eventually edge protrusions are formed. The edge protrusions are formed by remelting and condensing the protective film and the base material, and cannot be eliminated by the subsequent brushing. When the power density I is $1.0 \times 10^6$ W/cm² or more, the laser-etching mainly depends on gasification, the light absorption rate is greatly improved, and the etching efficiency is remarkably improved. The vaporized material is brought out of the etching area due to the purge gas and the dust collection system. A small amount of residue remains near the grooves and is removed together with the protective film during the subsequent brushing process, obtaining shape-controllable grooves. Therefore, the present invention requires that the power density of the laser is $1.0 \times 10^6$ W/cm² or more.

In addition, the inventors have also studied in detail the correlation between the energy of the incident laser and the magnetic properties of the final product. It was found that the energy of the incident laser is closely related to the magnetic properties of the final product. The total energy of the laser received per unit area is represented by the energy density of the laser $e_0$. The definition formula of $e_0$ is:

$$e_0 = \frac{D_y P}{V_s S}$$

wherein, $D_y$ represents the length of the spot along the scanning direction, and $V_s$ is the scanning speed of the laser.

When the energy density of the laser is too low, i.e., less than 0.8 J/mm², the material peeled off by laser ablation is too small to achieve an effect of refining the magnetic domain. When the energy density of the laser is too high, i.e., higher than 8.0 J/mm², excessive laser energy is introduced. As a result, on the one hand, the depth of the grooves formed is too deep, resulting in a decrease in magnetic induction. On the other hand, the controllability of the grooves is deteriorated, the bottom is not flat, and it is liable to form protrusions on the edge due to melting.

Further, the inventors obtained a technical solution for matching the energy density of the laser with the film on the surface to optimize the magnetic properties of the grain-oriented silicon steel by repeated experimental research. Specifically, the purpose of optimizing the etching effect is achieved by controlling the ratio between the energy density of the laser and the thickness of the film on the surface. FIG. 6 illustrates the advantageous effects of the present invention by taking grain-oriented silicon steel of 0.23 mm as an example. When the ratio a between the energy density of the laser and the thickness of the film on the surface is less than 0.6, P17/50 is not significantly improved. When the value of a is higher than 7.0, the improvement rate of P17/50 is gradually decreased, but the magnetic induction B8 is rapidly deteriorated, which is due to the magnetic flux leakage and enlarged heat conduction range.

Meanwhile, although the presence of the etching grooves can refine the magnetic domain and reduce the iron loss, the magnetic permeability at the grooves is very low, which has a certain damage effect on B8. After investigating in detail the relationship between the size of the grooves and the iron loss and magnetic induction of the silicon steel sheet, the inventors have found that in order to reduce the iron loss of the silicon steel sheet while not significantly lowering B8, the size and spacing of the grooves need to satisfy the certain conditions. When the width of the grooves is less than 20 μm, etching is difficult, and the coupling energy between the free magnetic poles on both sides of the grooves increases, which compensates for the change of the system energy caused by the magnetic flux leakage, and thus the magnetic domain cannot be effectively refined. When the size of the grooves in the rolling direction exceeds 300 μm, the space between the grooves is too large, and the magnetic induction is remarkably lowered. When the depth of the grooves formed on the base by etching is less than 5 μm, the refinement effect on magnetic domain is small, and the loss of the silicon steel sheet is not lowered. When the depth of the grooves is greater than 50 μm, a large number of free magnetic poles lead to a large amount of exposed magnetic flux, the iron loss slightly decreases, but the magnetic induction is significantly reduced.

In addition, the space between grooves, and the angle between scoring lines and the transverse direction of the steel plate also significantly affect the iron loss and magnetic induction. When the space between adjacent grooves is too small, i.e., below 1 mm, the grooves are too dense and the magnetic induction is significantly reduced. When the space between adjacent grooves is too large, i.e., more than 10 mm, the refined magnetic domains cannot be formed within an effective range, and the iron loss is not improved. When the angle between the scoring lines and the rolling direction of the steel plate is more than 30°, the refinement effect of the magnetic domain is weakened, and the improvement rate of iron loss is low. Therefore, suitable scoring conditions for refining the magnetic domains and reducing the iron loss without significantly reducing the magnetic induction of the silicon steel sheet are as follows: a groove width between 5 and 300 μm, a groove depth between 5 and 60 μm, and a space between adjacent grooves between 1 and 10 mm.

The method of the present invention achieves heat-resistant laser-etching using a protective film by one-time scanning. The following technical solutions all fall within the scope of the present invention: the grooves formed exhibit one of an approximate triangular shape, a trapezoidal shape, a semi-circular shape, an elliptical shape or a deformation thereof in the cross-sectional direction of the steel plate, the scoring lines are arranged in parallel along the rolling direction of the steel plate. The groove size formed is within the scope of the present invention.

DETAILED DESCRIPTION

The embodiments and effects of the present invention are exemplified below, but the present invention is not limited to the specific embodiments described in the examples.

Figure 1:
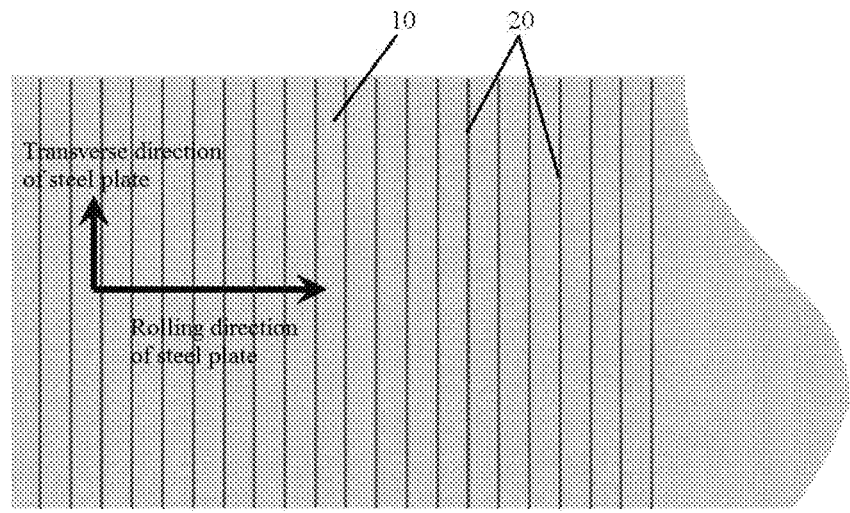
FIG. 1 is a macroscopic view of linear grooves formed on the surface of grain-oriented silicon steel by laser-etching in the present invention.
Figure 2:
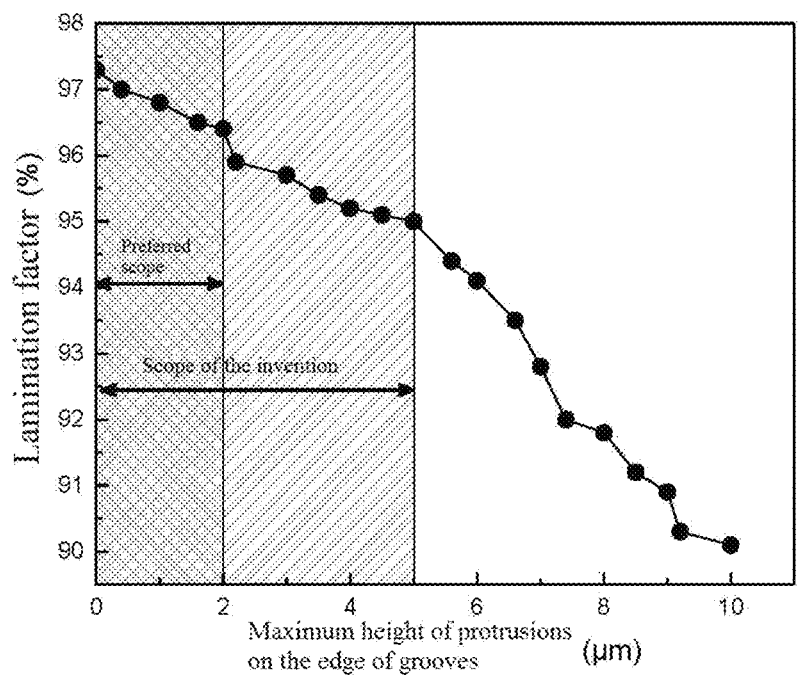
FIG. 2 shows the scope of the maximum height of the protrusions on the edge of the grooves required by the present invention.
Figure 3:
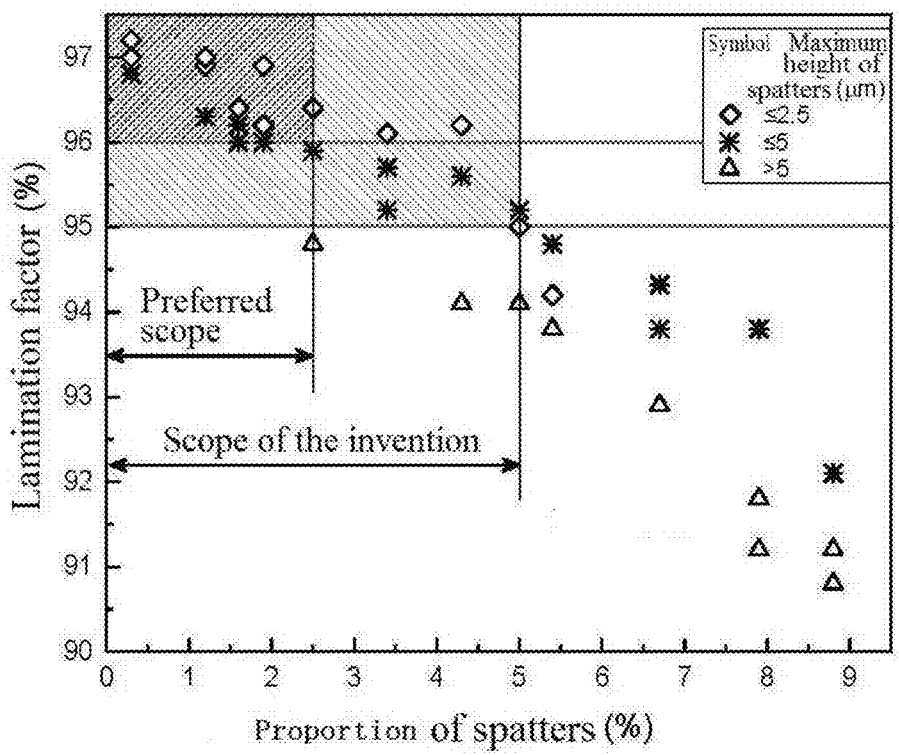
FIG. 3 shows the proportion of the surface area occupied by the spatters and the range of the maximum height of the spatters required by the present invention.
Figure 4:
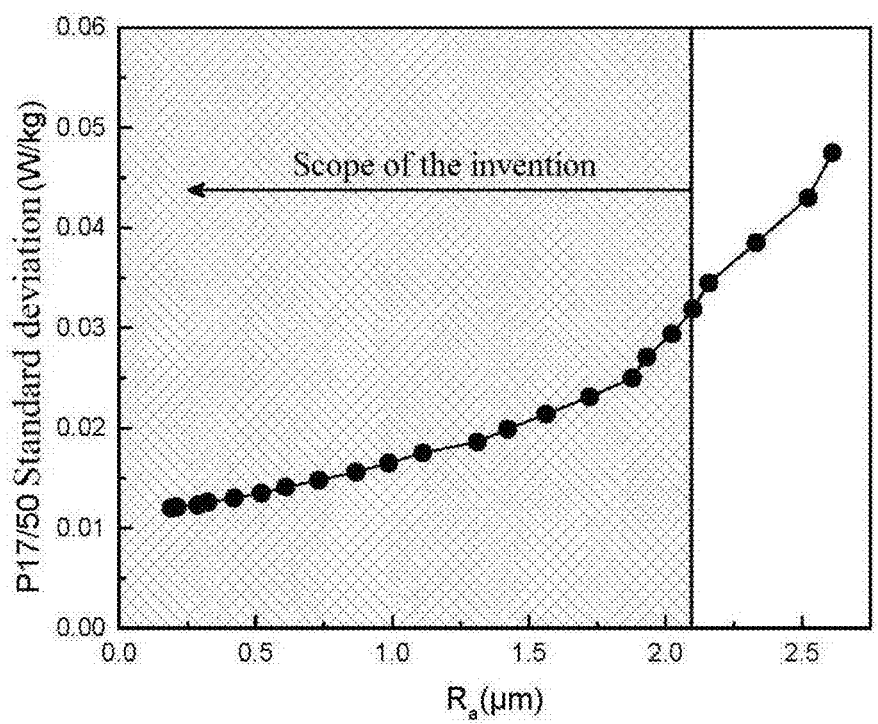
FIG. 4 shows the range of the roughness of the center line in the bottom of the grooves required by the present invention.
Figure 5:
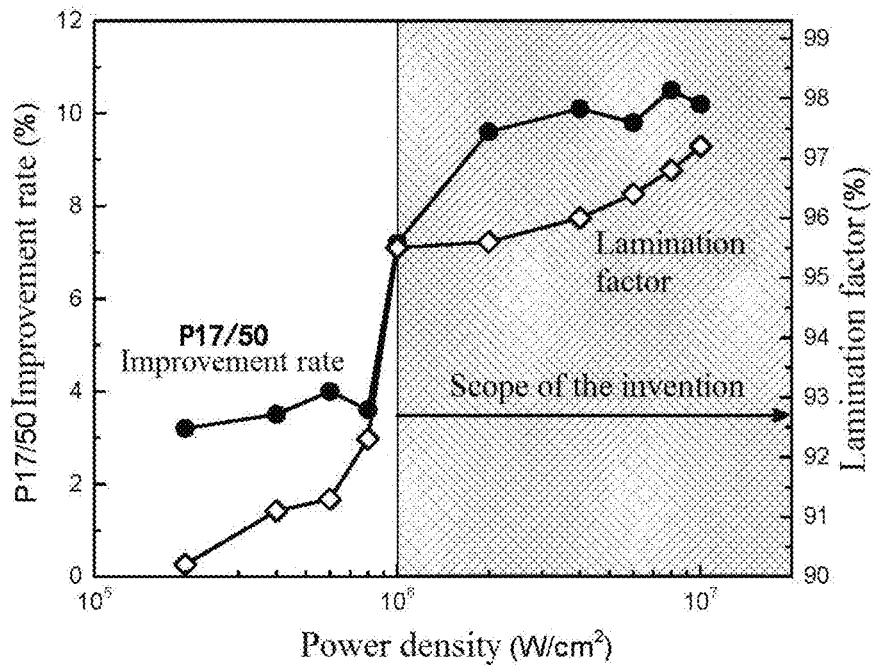
FIG. 5 shows the range of power density of the laser required by the present invention.
Figure 6:
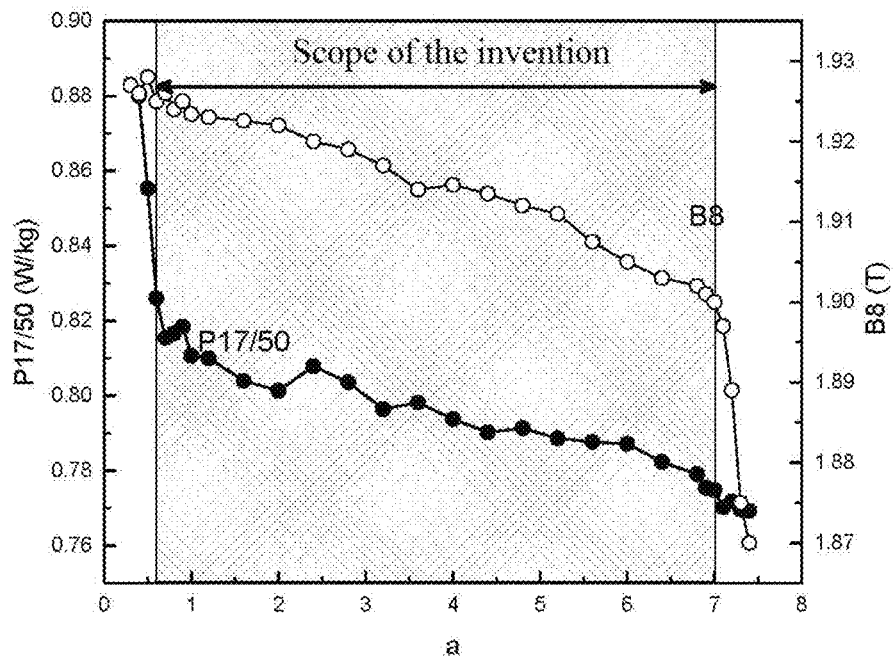
FIG. 6 shows the range of the ratio between the energy density of the laser and the thickness of the film required by the present invention.
Figure 7:
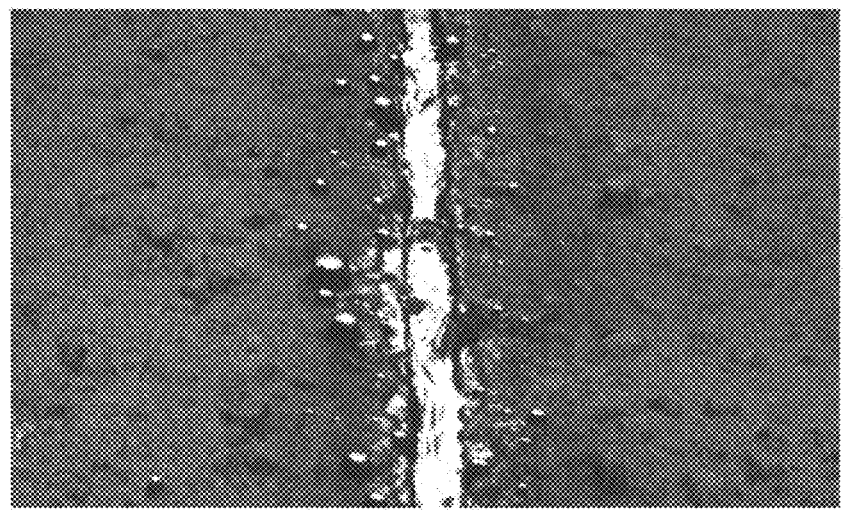
FIG. 7 is a view showing the surface morphology of a steel plate subjected to laser-etching after applying the protective film in the present invention.
Figure 8:
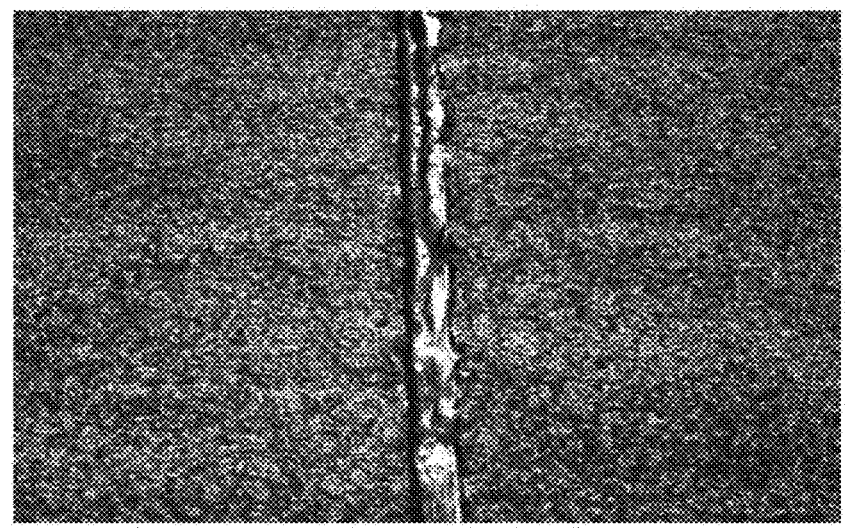
FIG. 8 is a view showing the morphology of the grooves after cleaning the protective film in the present invention.

FIG. 1 shows the laser-scribed grain-oriented silicon steel 10 resistant to stress-relief annealing in the present invention, wherein parallel linear grooves 20 are formed on one or both sides of grain-oriented silicon steel by laser etching, the linear grooves are perpendicular to, or at an angle to, the direction of rolling the silicon steel into a steel plate; a maximum height of edge protrusions of the linear grooves does not exceed 5 μm, and a maximum height of spatters in etch-free regions between adjacent linear grooves does not exceed 5 μm, and the proportion of an area occupied by spatters in the vicinity of the linear grooves does not exceed 5%.

Preferably, the line roughness $R_a$ of the center line in the bottom of the linear grooves is not more than 2.1 μm.

Preferably, the linear grooves are approximately triangular, trapezoidal, semi-circular or elliptical.

Preferably, the angle between the linear grooves and the rolling direction of the steel plate is 0~30°.

Preferably, the linear grooves have a width of 5 to 300 μm and a depth of 5 to 60 μm, and the space between adjacent linear grooves is 1 to 30 mm.

Example 1

The grain-oriented silicon steel was subjected to iron making, steel making, continuous casting, and hot rolling process. Next, single cold rolling was performed to roll the steel to a final thickness of 0.23 mm. Then, decarburization annealing was performed to form a surface oxide layer. Then, the steel was coated with MgO separator on the surface, and subjected to high-temperature annealing at 1250° C. for 20 hours. Then, unreacted residual MgO was washed away. Thereafter, the surface of the steel was roll coated and dried to form a protective film. Next, a YAG laser was used to etch linear grooves at equal intervals along the rolling direction of the steel plate. The laser has an output power of 2000 W and an average pulse width of 800 ns. The spot formed by the laser focusing on the surface of the steel plate was elliptical with a short axis of 0.016 mm and a long axis of 0.5 mm. The scanning speed is 50 m/s. The calculated laser power density was $3.2 \times 10^7$ W/cm$^2$, and the laser energy density was 3.2 J/mm$^2$. The formed scoring lines are perpendicular to the rolling direction of the steel plate. The space between adjacent scoring lines is 4 mm. Then, a brushing process was performed to remove the surface protective film and the scored spatter residue. Finally, an insulating coating was applied to the surface of the steel and final annealing was performed to obtain a finished silicon steel sheet.

The magnetic properties were measured according to "GB/T 3655-2008 Methods of Measuring Magnetic Properties of Electrical Steel Sheet and Strip by Epstein Frame". The lamination factor was determined according to "GB/T 19289-2003 Methods of Measuring Density, Resistivity and Lamination Factor of Electrical Steel Sheet and Strip". The measurement results of Examples and Comparative Examples are shown in Table 1.

As can be seen from Table 1, Examples 1-10 have better iron loss, magnetic induction and lamination factor. However, the magnetic properties or lamination factor of Comparative Examples 1-10, which are not within the scope of the present invention, are relatively inferior.

Example 2. Influence of the Roughness $R_a$ of the Center Line on Magnetic Properties The grain-oriented silicon steel was subjected to iron making, steel making, continuous casting, and hot rolling process. Next, single cold rolling was performed to roll the steel to a final thickness of 0.225 mm. Then, decarburization annealing was performed to form a surface oxide layer. Then, the steel was coated with MgO separator on the surface, and subjected to high-temperature annealing at 1200° C. for 20 hours. Then, unreacted residual MgO was washed away. Thereafter, the surface of the steel was roll coated and dried to form a ZnO protective film with a thickness controlled to 2.5 μm. Next, a continuous $CO_2$ laser was used to etch linear grooves at equal intervals along the rolling direction of the steel plate. The formed scoring lines are perpendicular to the rolling direction of the steel plate. The space between adjacent scoring lines is 4.5 mm. Then, a brushing process was performed to remove the surface protective film and the etching spatter residue. Finally, an insulating coating was applied to the surface of the steel and final annealing was performed to obtain a finished silicon steel sheet.

The magnetic properties were measured according to the SST 60 mm×300 mm method. The measurement results of the Examples and Comparative Examples are shown in Table 2.

As can be seen from Table 2, the laser parameters within the scope of the present invention enable the silicon steel sheet to obtain uniform and stable magnetic properties. However, in Comparative Examples beyond the scope of the present invention, the fluctuation of the magnetic properties is increased due to the overlarge $R_a$ of the center line in the bottom of the grooves.

Example 3

The grain-oriented silicon steel was subjected to iron making, steel making, continuous casting, and hot rolling process. Next, single cold rolling was performed to roll the steel to a final thickness of 0.225 mm. An $Al_2O_3$ protective film was applied by spraying on the surface of the steel. The proportion of $Al_2O_3$ particles having a particle diameter of 500 μm or more in the protective film is about 5%. Then, a YAG laser having a pulse width of 300 ns was used to etch linear grooves. Approximate triangular grooves were formed by adjusting the size of the focused spot, the scanning speed, and the laser scoring energy. The angle between scoring lines and the transverse direction of the steel plate is 8°, and the space between scoring lines in the rolling direction is 4 mm. Then, a brushing process was performed to remove the surface protective film. Then, decarburization annealing was performed to form a surface oxide layer. Then, the steel was coated with MgO separator on the surface, and subjected to high-temperature annealing at 1250° C. for 20 hours after winding into a coil. Finally, the residual MgO was washed away, an insulating coating was applied to the surface of the steel, and final annealing was performed to obtain a finished silicon steel sheet.

The magnetic properties were measured according to "GB/T 3655-2008 Methods of Measuring Magnetic Properties of Electrical Steel Sheet and Strip by Epstein Frame". The lamination factor was determined according to "GB/T 19289-2003 Methods of Measuring Density, Resistivity and Lamination Factor of Electrical Steel Sheet and Strip". The measurement results of Examples and Comparative Examples are shown in Table 3.

As can be seen from Table 3, the Examples in which the energy density of the laser is within the scope of the present invention have good magnetic properties. Comparative Examples beyond the scope of the present invention have magnetic properties inferior to those of the present invention.

Example 4

The grain-oriented silicon steel was subjected to iron making, steel making, continuous casting, and hot rolling process. Next, single cold rolling was performed to roll the steel to a final thickness of 0.195 mm. Then, decarburization annealing was performed to form a surface oxide layer. Then, the steel was coated with MgO separator on the surface to obtain a film having a thickness of about 9.5 μm. Next, a YAG laser was used to etch linear grooves at equal intervals along the rolling direction of the steel plate. The laser has an output power of 2000 W and an average width of a single pulse of 800 ns. The spot formed by the laser focusing on the surface of the steel plate was elliptical with a short axis of 0.016 mm and a long axis of 0.5 mm. The scanning speed is 50 m/s. The calculated laser power density was $3.2 \times 10^7$ W/cm$^2$, and the laser energy density was 3.2 J/mm$^2$. The formed scoring lines are perpendicular to the rolling direction of the steel plate. The space between adjacent scoring lines is 4 mm. Then, the steel was subjected to high-temperature annealing at 1250° C. for 20 hours. Then, unreacted residual MgO was washed away. Finally, an insulating coating was applied to the surface of the steel plate, and final annealing was performed to obtain a finished silicon steel sheet.

The magnetic properties were measured according to "GB/T 3655-2008 Methods of Measuring Magnetic Properties of Electrical Steel Sheet and Strip by Epstein Frame". The lamination factor was determined according to "GB/T 19289-2003 Methods of Measuring Density, Resistivity and Lamination Factor of Electrical Steel Sheet and Strip". The measurement results of Examples and Comparative Examples are shown in Table 4.

In Example 4, the thickness of the film formed by MgO separator was adjusted to make the ratio of the energy density to the film thickness within the range of the present invention, so that the magnesium oxide functions as both a separator and a protective film. The residual magnesium oxide was washed away together with the spatters and the like after annealing at a high temperature. As can be seen from the comparison of the above Examples and Comparative Examples, when the process parameters of the laser are within the scope of the present invention, a silicon steel sheet having refined magnetic domains and reduced iron loss can be obtained. When the process parameters of the laser are beyond the scope of the invention, the silicon steel sheet obtained either has a high iron loss or a low lamination factor.

In summary, the present invention forms linear grooves on the surface of the steel plate by applying a protective film and one-time laser scanning. Since the protective film has the absorption characteristics on the laser, it is ensured that the morphology of the formed grooves is controllable, the iron loss of the obtained finished silicon steel sheet is remarkably lowered, and the lamination factor is not significantly deteriorated. The silicon steel of the present invention is particularly suitable for manufacturing of wound iron core transformers. The method of the invention has the advantages of simple process, high production efficiency, and high application value and application prospect.

TABLE 1

| Illustration | Protective film powder | Proportion of Moisture % | Proportion of Particles ≥500 μm % | Ratio a of energy density to film thickness | Groove depth (μm) | Groove width (μm) | Maximum height of edge protrusions (μm) | Maximum height of spatters (μm) | Area proportion of spatters % | P17/50 (W/kg) | B8 (T) | Lamination factor % |
|---|---|---|---|---|---|---|---|---|---|---|---|---|
| Example 1 | MgO | 0.3 | 10 | 0.6 | 16.2 | 41.0 | 0.8 | 4.3 | 4.6 | 0.813 | 1.920 | 95.1 |
| Example 2 | MgO | 0.3 | 10 | 7.0 | 43.3 | 48.2 | 1.3 | 4.8 | 4.9 | 0.778 | 1.901 | 95.2 |
| Example 3 | MgO | 5.5 | 10 | 0.6 | 13.1 | 38.0 | 0 | 0.2 | 0.4 | 0.811 | 1.919 | 96.5 |
| Example 4 | MgO | 5.5 | 10 | 7.0 | 45.2 | 43.2 | 0.3 | 0 | 0 | 0.785 | 1.902 | 97.2 |
| Example 5 | MgO | 2.1 | 5 | 3.6 | 24.3 | 36.5 | 0 | 0 | 0 | 0.792 | 1.913 | 96.9 |
| Comparative Example 1 | MgO | 0.2 | 5 | 3.6 | 23.6 | 38.3 | 1.1 | 5.3 | 5 | 0.793 | 1.905 | 94.6 |
| Comparative Example 2 | MgO | 5.7 | 5 | 3.6 | 23.2 | 37.5 | 0 | 0.3 | 0.2 | 0.865 | 1.889 | 96.4 |
| Comparative Example 3 | MgO | 2.1 | 12 | 3.6 | 12.1 | 34.3 | 1.3 | 5.2 | 4.6 | 0.815 | 1.921 | 94.7 |
| Comparative Example 4 | MgO | 2.1 | 5 | 0.5 | 10.1 | 35.0 | 0.3 | 0.4 | 0.4 | 0.882 | 1.926 | 96.3 |
| Comparative Example 5 | MgO | 2.1 | 5 | 7.2 | 53.5 | 55.6 | 1.2 | 0.4 | 0.46 | 0.779 | 1.897 | 96.3 |
| Example 6 | $Al_2O_3$ | 0.3 | 10 | 0.6 | 15.3 | 38.9 | 0.6 | 3.8 | 3.8 | 0.815 | 1.922 | 95.8 |
| Example 7 | $Al_2O_3$ | 0.3 | 10 | 7.0 | 46.1 | 49.1 | 1.4 | 4.9 | 5 | 0.780 | 1.9 | 95.1 |
| Example 8 | $Al_2O_3$ | 5.5 | 10 | 0.6 | 15.2 | 36.2 | 0 | 0 | 0 | 0.810 | 1.921 | 97.5 |
| Example 9 | $Al_2O_3$ | 5.5 | 10 | 7.0 | 48.3 | 48.8 | 0.6 | 0 | 0 | 0.788 | 1.901 | 96.8 |
| Example 10 | $Al_2O_3$ | 2.1 | 5 | 3.6 | 21.2 | 35.3 | 0 | 0.6 | 0.4 | 0.794 | 1.908 | 95.9 |
| Comparative Example 6 | $Al_2O_3$ | 0.2 | 5 | 3.6 | 21.5 | 46.7 | 5.1 | 5.7 | 6.1 | 0.796 | 1.904 | 93.2 |
| Comparative Example 7 | $Al_2O_3$ | 5.7 | 5 | 3.6 | 20.3 | 28.2 | 0 | 0 | 0 | 0.873 | 1.876 | 96.6 |
| Comparative Example 8 | $Al_2O_3$ | 2.1 | 12 | 3.6 | 11.5 | 25.6 | 0.8 | 3.6 | 5.2 | 0.818 | 1.919 | 94.9 |
| Comparative Example 9 | $Al_2O_3$ | 2.1 | 5 | 0.5 | 9.8 | 23.6 | 0.2 | 0.9 | 1.1 | 0.879 | 1.922 | 95.9 |
| Comparative Example 10 | $Al_2O_3$ | 2.1 | 5 | 7.2 | 56.6 | 58.2 | 2.1 | 1.0 | 0.9 | 0.775 | 1.885 | 96.3 |

TABLE 2

| Illustration | Laser power (W) | Spot long axis (mm) | Spot short axis (mm) | Scanning speed (m/s) | Ratio a of energy density to film thickness | Power density (W/cm$^2$) | Energy density (J/mm$^2$) | $R_a$ (μm) | Mean of P17/50 (W/kg) | Standard deviation of P17/50 (W/kg) | Mean of B8 (T) | Standard deviation of B8 (T) |
|---|---|---|---|---|---|---|---|---|---|---|---|---|
| Example 1 | 5000 | 0.030 | 0.5 | 90 | 0.94 | $4.2 \times 10^7$ | 2.36 | 0.3 | 0.795 | 0.010 | 1.901 | 0.013 |
| Example 2 | 1500 | 0.016 | 0.5 | 60 | 0.80 | $2.4 \times 10^7$ | 1.99 | 0.4 | 0.799 | 0.011 | 1.903 | 0.012 |
| Example 3 | 2000 | 0.020 | 0.6 | 60 | 0.85 | $1.3 \times 10^7$ | 2.12 | 0.5 | 0.794 | 0.013 | 1.901 | 0.011 |
| Example 4 | 1200 | 0.015 | 1.2 | 50 | 0.81 | $8.5 \times 10^6$ | 2.04 | 0.8 | 0.8 | 0.016 | 1.902 | 0.015 |
| Example 5 | 1000 | 0.014 | 1.2 | 50 | 0.73 | $7.6 \times 10^6$ | 1.82 | 1.1 | 0.801 | 0.018 | 1.902 | 0.016 |
| Example 6 | 2500 | 0.016 | 5.0 | 80 | 0.99 | $4.0 \times 10^6$ | 2.49 | 1.6 | 0.795 | 0.021 | 1.904 | 0.018 |
| Example 7 | 1000 | 0.012 | 10.0 | 50 | 0.85 | $1.1 \times 10^6$ | 2.12 | 2.1 | 0.802 | 0.033 | 1.906 | 0.023 |
| Comparative Example 1 | 1000 | 0.012 | 11.0 | 50 | 0.85 | $9.6 \times 10^5$ | 2.12 | 2.2 | 0.821 | 0.035 | 1.901 | 0.031 |
| Comparative Example 2 | 2000 | 0.020 | 16.0 | 60 | 0.85 | $8.0 \times 10^5$ | 2.12 | 2.8 | 0.828 | 0.040 | 1.901 | 0.035 |

TABLE 3

| Illustration | Laser power (W) | Spot long axis (mm) | Spot short axis (mm) | Scanning speed (m/s) | Power density (W/cm$^2$) | Energy density (J/mm$^2$) | Protective film thickness (μm) | Ratio a of energy density to film thickness | P17/50 (W/kg) | B8 (T) | Lamination factor % |
|---|---|---|---|---|---|---|---|---|---|---|---|
| Example 1 | 1100 | 0.012 | 0.1 | 140 | 8.3 × 10$^7$ | 0.83 | 1.2 | 0.69 | 0.845 | 1.907 | 96.5 |
| Example 2 | 1500 | 0.012 | 0.8 | 100 | 2.0 × 10$^7$ | 1.59 | 2.2 | 0.72 | 0.841 | 1.91 | 96.4 |
| Example 3 | 2000 | 0.012 | 1.0 | 90 | 2.1 × 10$^7$ | 2.36 | 3.2 | 0.74 | 0.843 | 1.913 | 96.6 |
| Example 4 | 3000 | 0.020 | 5.0 | 80 | 3.8 × 10$^6$ | 2.39 | 3.0 | 0.80 | 0.839 | 1.908 | 96.3 |
| Example 5 | 4000 | 0.020 | 2.0 | 70 | 1.3 × 10$^7$ | 3.64 | 3.0 | 1.21 | 0.836 | 1.903 | 96.5 |
| Example 6 | 5000 | 0.016 | 0.5 | 50 | 8.0 × 10$^7$ | 7.96 | 6.2 | 1.28 | 0.837 | 1.905 | 95.8 |
| Comparative Example 1 | 5200 | 0.016 | 0.5 | 50 | 8.3 × 10$^7$ | <u>8.28</u> | 7.5 | 1.10 | 0.831 | 1.898 | 94.6 |
| Comparative Example 2 | 4500 | 0.016 | 0.5 | 35 | 7.2 × 10$^7$ | <u>10.23</u> | 6.5 | 1.57 | 0.829 | 1.881 | 91.4 |
| Comparative Example 3 | 1100 | 0.012 | 0.1 | 150 | 8.3 × 10$^7$ | <u>0.78</u> | 1.2 | 0.65 | 0.912 | 1.922 | 96.7 |
| Comparative Example 4 | 1000 | 0.012 | 0.1 | 150 | 1.1 × 10$^8$ | <u>0.71</u> | 1.0 | 0.71 | 0.923 | 1.926 | 97.2 |
| Comparative Example 5 | 3000 | 0.020 | 5.0 | 80.0 | 3.8 × 10$^6$ | 2.39 | No protective film | | 0.853 | 1.901 | 90.1 |

TABLE 4

| Illustration | Laser power (W) | Spot long axis (mm) | Spot short axis (mm) | Scanning speed (m/s) | Power density (W/cm$^2$) | Energy density (J/mm$^2$) | Ratio a of energy density to film thickness | P17/50 (W/kg) | B8 (T) | Lamination factor % |
|---|---|---|---|---|---|---|---|---|---|---|
| Example 1 | 2500 | 0.012 | 1.0 | 40.0 | 2.7 × 10$^7$ | 6.63 | 1.11 | 0.685 | 1.907 | 96.1 |
| Example 2 | 3000 | 0.016 | 1.6 | 45.0 | 1.5 × 10$^7$ | 5.31 | 0.88 | 0.681 | 1.91 | 96.2 |
| Example 3 | 2500 | 0.012 | 1.0 | 40.0 | 2.7 × 10$^7$ | 6.63 | 1.11 | 0.683 | 1.913 | 96.1 |
| Example 4 | 3000 | 0.016 | 1.6 | 40.0 | 1.5 × 10$^7$ | 5.97 | 0.99 | 0.679 | 1.908 | 96.2 |
| Example 5 | 5000 | 0.016 | 0.8 | 80.0 | 5.0 × 10$^7$ | 4.97 | 0.83 | 0.677 | 1.905 | 95.8 |
| Comparative Example 1 | 2500 | 0.016 | 10.0 | 60.0 | 2.0 × 10$^6$ | 3.32 | <u>0.55</u> | 0.753 | 1.916 | 95.9 |
| Comparative Example 2 | 3000 | 0.016 | 0.5 | 25.0 | 4.8 × 10$^7$ | <u>9.55</u> | 1.59 | 0.669 | 1.899 | 91.4 |

The invention claimed is:

1. A laser-scribed grain-oriented silicon steel resistant to stress-relief annealing, wherein parallel linear grooves are formed on one or both sides of grain-oriented silicon steel by laser etching, wherein the linear grooves are perpendicular to, or at an angle to, the direction of rolling the silicon steel into a steel plate; a maximum height of edge protrusions of the linear grooves does not exceed 5 μm, and a maximum height of spatters in etch-free regions between adjacent linear grooves does not exceed 5 μm, and the proportion of spatters per unit area in the etch-free regions between adjacent linear grooves does not exceed 5%, wherein the line roughness $R_a$ of a center line in the bottom of the linear grooves is not more than 2.1 μm.

2. The laser-scribed grain-oriented silicon steel resistant to stress-relief annealing of claim 1, wherein the heights of the spatters do not exceed 2 μm, and the proportion of spatters per unit area in the etch-free regions between adjacent linear grooves does not exceed 2.5%.

3. The laser-scribed grain-oriented silicon steel resistant to stress-relief annealing of claim 1, wherein the line roughness Ra of a center line in the bottom of the linear grooves is not more than 0.52 μm.

4. The laser-scribed grain-oriented silicon steel resistant to stress-relief annealing of claim 1, wherein the linear grooves are approximately triangular, trapezoidal, semicircular or elliptical.

5. The laser-scribed grain-oriented silicon steel resistant to stress-relief annealing of claim 1, wherein an angle between the linear grooves and the direction of rolling the silicon steel into a steel plate is 0 to 30°.

6. The laser-scribed grain-oriented silicon steel resistant to stress-relief annealing of claim 1, wherein the linear grooves have a width of 5 to 300 μm and a depth of 5 to 60 μm, and a space between adjacent linear grooves is 1 to 10 mm.

7. A method for manufacturing the laser-scribed grain-oriented silicon steel resistant to stress-relief annealing of claim 1, comprising steps of smelting, continuous casting, hot rolling, single cold rolling, or double cold rolling with intermediate annealing, decarburization annealing including applying MgO separator on a surface of the silicon steel, high-temperature annealing, and forming a finished grain-oriented silicon steel by hot stretching, temper rolling and annealing, wherein the method further comprises laser-etching, which is performed before the decarburization annealing, or before or after the hot stretching, temper rolling and annealing; the laser-etching comprises the following steps:
1) forming a protective film on a surface of the grain-oriented silicon steel;
2) laser-etching a surface of the grain-oriented silicon steel to form a series of linear grooves perpendicular to or at an angle to the direction of rolling the silicon steel into a steel plate;
3) brushing the surface of the grain-oriented silicon steel to remove the protective film, and drying, thereby producing the laser-scribed grain-oriented silicon steel resistant to stress-relief annealing of claim 1.

8. The method for manufacturing the laser-scribed grain-oriented silicon steel resistant to stress-relief annealing of claim 7, wherein the protective film is formed by a metal oxide powder, and has a moisture content of between 0.3 wt % and 5.5 wt %.

9. The method for manufacturing the laser-scribed grain-oriented silicon steel resistant to stress-relief annealing of claim 7, wherein the protective film has a thickness of between 1.0 μm and 13.0 μm.

10. The method for manufacturing the laser-scribed grain-oriented silicon steel resistant to stress-relief annealing of claim 8, wherein the metal oxide powder is water-insoluble, and is a single powder or a combination of several powders, and the proportion of particles having a particle diameter of 500 μm or more in the powder(s) is 10% by volume or less.

11. The method for manufacturing the laser-scribed grain-oriented silicon steel resistant to stress-relief annealing of claim 8, wherein the metal oxide powder is one or more of an alkaline earth metal oxide, $Al_2O_3$, ZnO or ZrO.

12. The method for manufacturing the laser-scribed grain-oriented silicon steel resistant to stress-relief annealing of claim 7, wherein the laser in the laser-etching step has a power density I of not less than $1.0 \times 10^6$ W/cm², and an average energy density $e_0$ of between 0.8 J/mm² and 8.0 J/mm², and a ratio of the average energy density to the thickness of the protective film of between 0.6 and 7.0.

13. A method for producing the laser-scribed grain-oriented silicon steel resistant to stress-relief annealing of claim 1, comprising steps of smelting, continuous casting, hot rolling, single cold rolling, or double cold rolling with intermediate annealing, decarburization annealing, applying MgO separator on a surface of a steel plate produced above, high-temperature annealing, forming a finished oriented silicon steel by hot stretching, temper rolling, annealing and applying an insulating coating, wherein laser-etching is performed after the decarburization annealing to form a series of linear grooves perpendicular to or at an angle to the direction of rolling the silicon steel into a steel plate, on a surface of the grain-oriented silicon steel.

14. The method for manufacturing the laser-scribed grain-oriented silicon steel resistant to stress-relief annealing of claim 13, wherein a laser-generating pump source used in the laser-etching step is one or more of a $CO_2$ laser, a solid laser, and a fiber-optic laser, and laser is continuous or pulsed.

15. The method for manufacturing the laser-scribed grain-oriented silicon steel resistant to stress-relief annealing of claim 7, wherein a laser-generating pump source used in the laser-etching step is one or more of a $CO_2$ laser, a solid laser, and a fiber-optic laser, and laser is continuous or pulsed.

* * * * *